Figure 3:
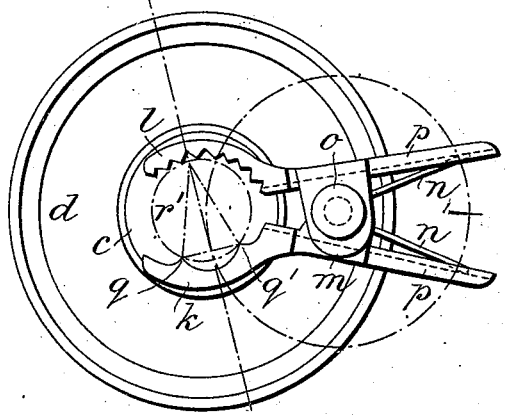

(No Model.) 6 Sheets—Sheet 1.
R. H. HEPBURN.
CANDLE HOLDER.
No. 516,330. Patented Mar. 13, 1894.
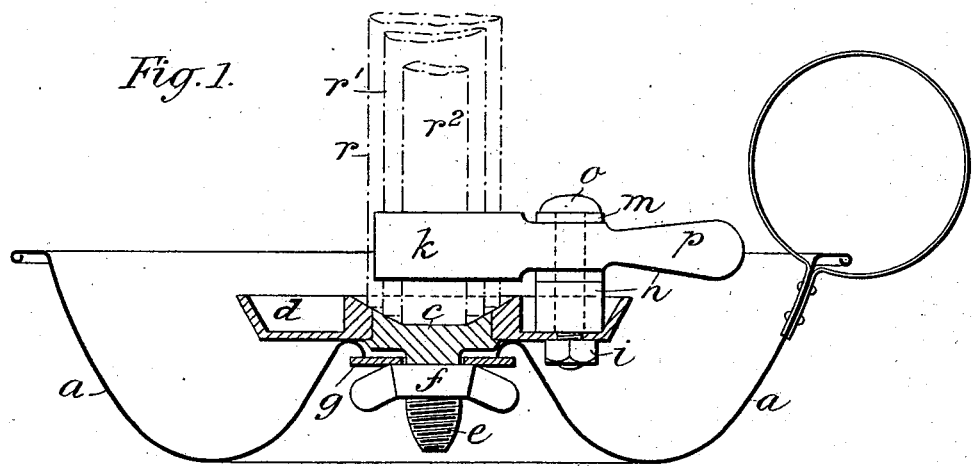
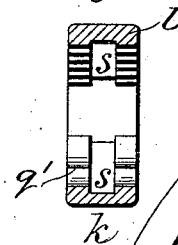
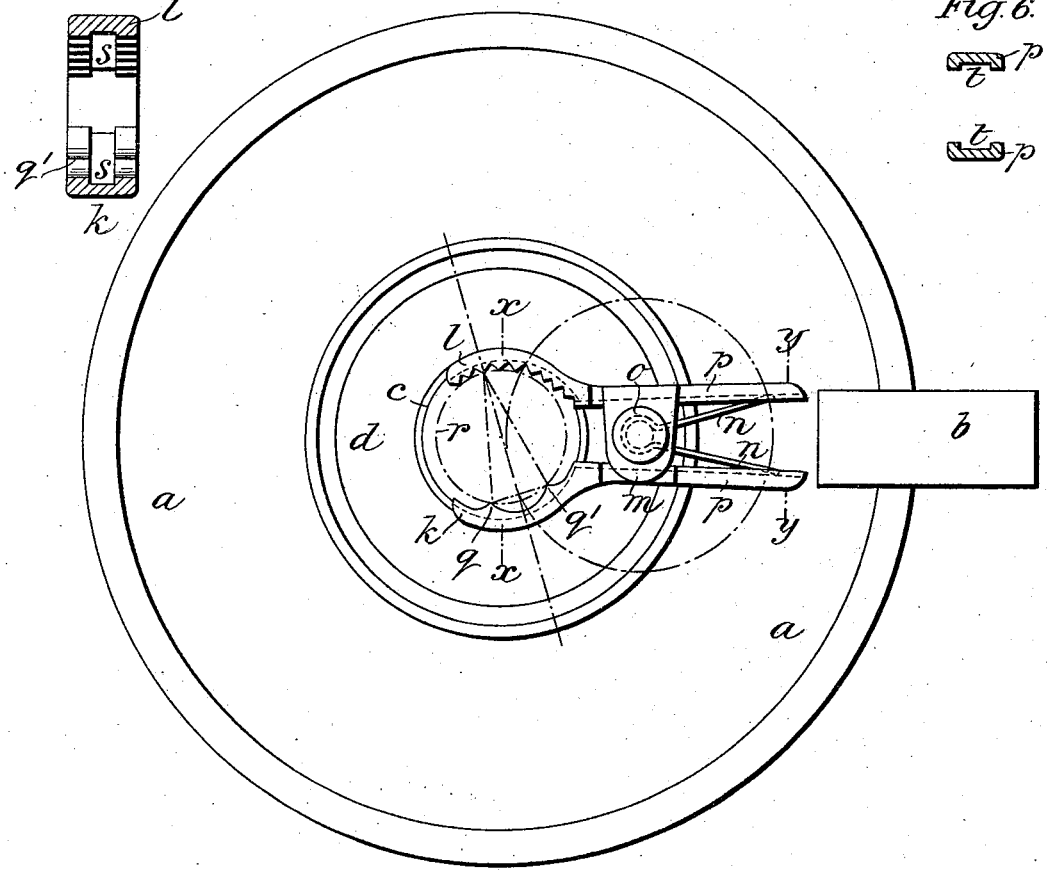
WITNESSES:
Fred White
Thomas H. Wallace
INVENTOR:
Robert Henry Hepburn,
By his Attorney
Arthur C. Fraser & Co (No Model.) 6 Sheets—Sheet 2.

R. H. HEPBURN.
CANDLE HOLDER.

No. 516,330. Patented Mar. 13, 1894.

WITNESSES:
Fred White
Thomas F. Wallace

INVENTOR:
Robert Henry Hepburn,
By his Attorneys
Arthur E. Draser & Co.

(No Model.)  R. H. HEPBURN.  6 Sheets—Sheet 3
CANDLE HOLDER.
No. 516,330.  Patented Mar. 13, 1894.
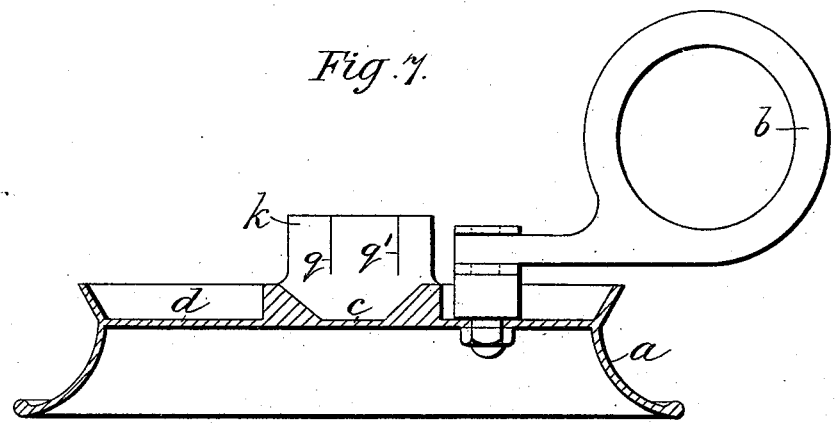
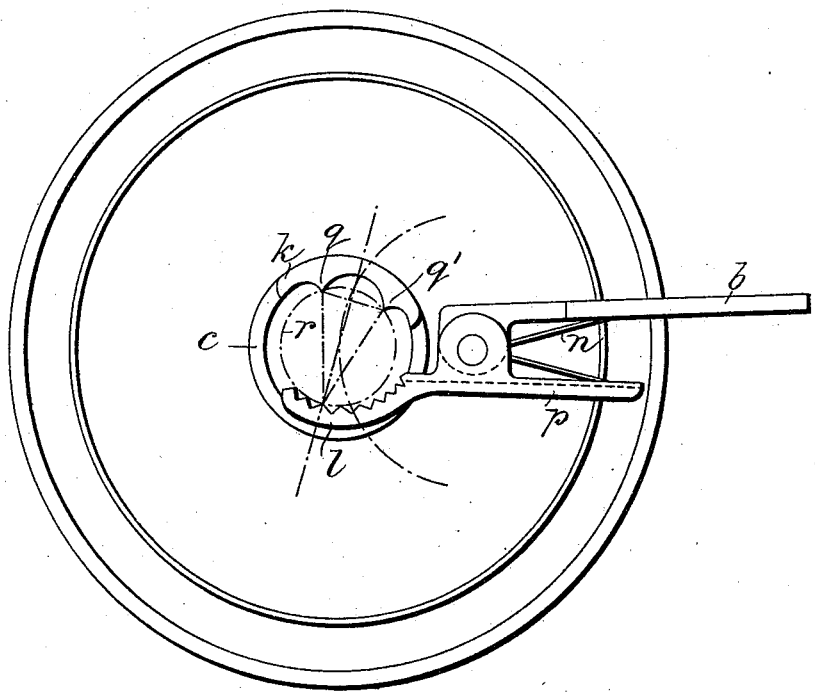
WITNESSES:
Fred White
Thomas H Wallace
INVENTOR:
Robert Henry Hepburn,
By his Attorneys:
Arthur G. Fraser & Co.

(No Model.)  6 Sheets—Sheet 4.

R. H. HEPBURN.
CANDLE HOLDER.

No. 516,330. Patented Mar. 13, 1894.

WITNESSES:
Fred White
Thomas F. Wallace

INVENTOR:
Robert Henry Hepburn,
By his Attorneys:
Arthur E. Fraser & Co.

(No Model.) 6 Sheets—Sheet 5.

R. H. HEPBURN.
CANDLE HOLDER.

No. 516,330. Patented Mar. 13, 1894.

WITNESSES:
Fred White
Thomas F. Wallace

INVENTOR:
Robert Henry Hepburn,
By his Attorneys:
Arthur E. Brasor & Co.

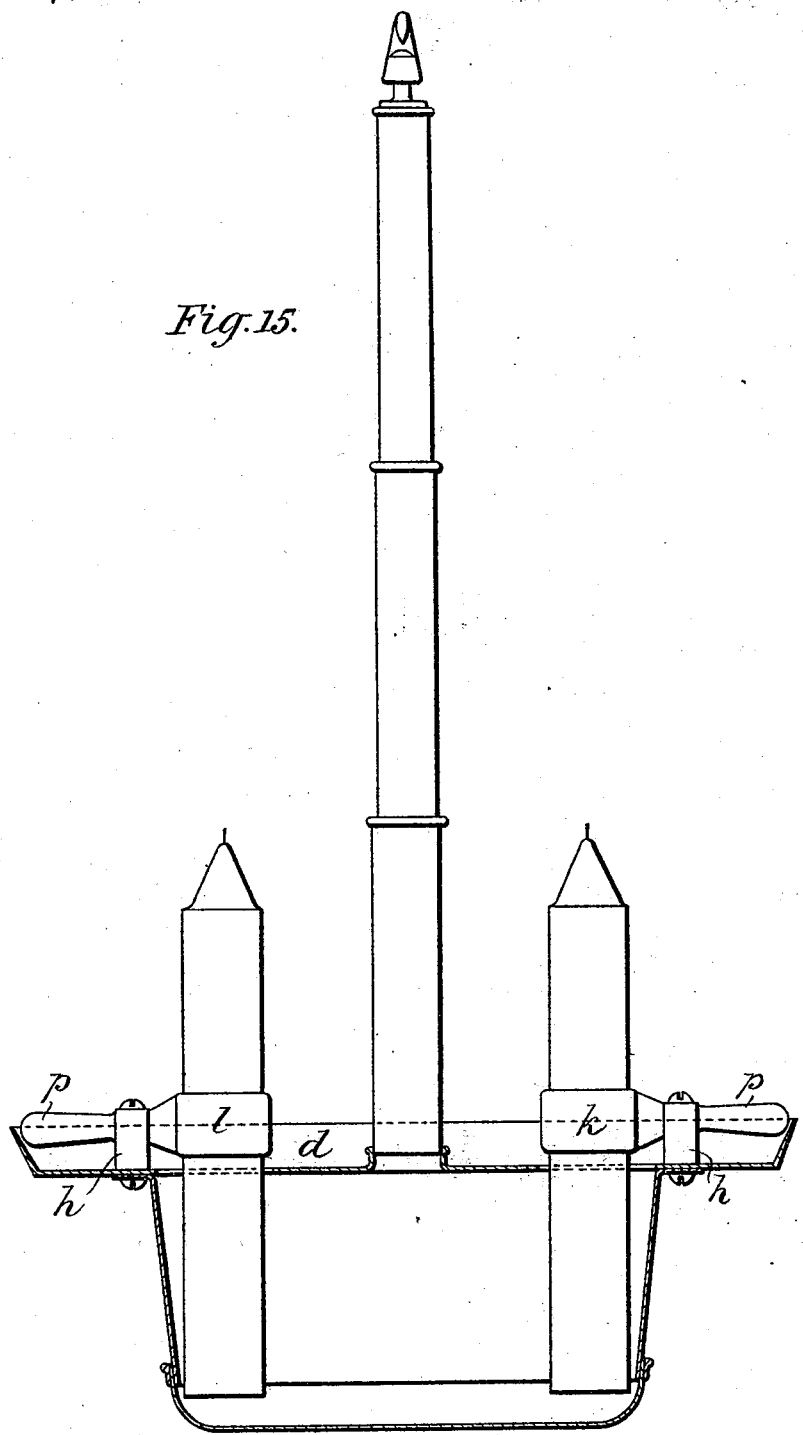

UNITED STATES PATENT OFFICE.

ROBERT HENRY HEPBURN, OF LONDON, ENGLAND.

CANDLE-HOLDER.

SPECIFICATION forming part of Letters Patent No. 516,330, dated March 13, 1894.

Application filed May 31, 1893. Serial No. 476,061. (No model.)

*To all whom it may concern:*

Be it known that I, ROBERT HENRY HEPBURN, of Westminster, England, have invented certain new and useful Improvements in Candle-Holders, of which the following is a specification.

My invention has reference to candle holders of the type which comprise a pair of spring jaws or grippers carried by a stick, socket, sconce, tray, bracket or other support, the said jaws or grippers serving to grasp the candle near its lower end and hold it as in a vise.

The chief object of the invention is to so construct or form the jaws or grippers that they will hold the candle in a safer and more certain manner whether the candle be of the size for which the holder is primarily intended, or of any smaller size, or even of a larger size.

The invention consists of improvements in holders having a pair of horizontal jaws or grippers one of which has two teeth at such a distance apart as is suitable to constitute with said two teeth two points for nipping or holding a candle, while a third point for nipping or holding the candle is obtained in the other jaw at a position as regards the candle which will vary according to the distance between the jaws as determined by the diameter of the candle whereby the candle whatever be its diameter is nipped at three points by what may appropriately be termed a triangular arrangement and is safely and securely held.

The device comprises the combination with a pair of horizontal jaws or grippers adapted to grasp or hold a candle near its lower end, of a seat for the candle and a tray or cup to catch grease.

In carrying out the invention I form on the gripping face of one of the jaws two teeth which are by preference of approximately Λ-shape, at such a distance from each other as is suitable to form two nipping or holding points, say a distance equal to about one-seventh or one-eighth of the circumference of the largest candle the holder is intended to receive. An imaginary line drawn between these two teeth forms the base of an isosceles triangle the apex of which is in the other jaw, and its position in the other jaw will vary according to the distance between the jaws as determined by the diameter of the candle. This other jaw is formed with teeth on its gripping face, and whatever be the diameter of the candle placed between the jaws the candle will be held or nipped by one tooth (or sometimes by two adjoining teeth) on this other jaw at the apex of the triangle and by the two teeth on the first described jaw. Sometimes I form the second jaw without teeth and in lieu thereof I turn the outer end of the jaw inward so as to form the nipping point; in this case the second jaw should be made shorter than the jaw that has the two nipping points. I either make both jaws spring jaws or I make one jaw a spring jaw and the other a fixture to the socket, tray, stick or other support. I preferably make the face of each jaw with a longitudinal groove at about the middle of its depth, as I find this improves the grip.

Figure 4:
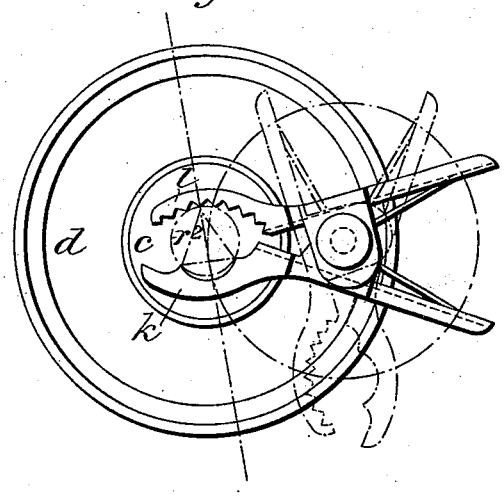
Figure 9:
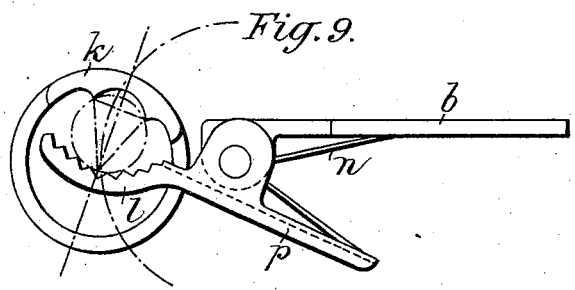
Figure 10:
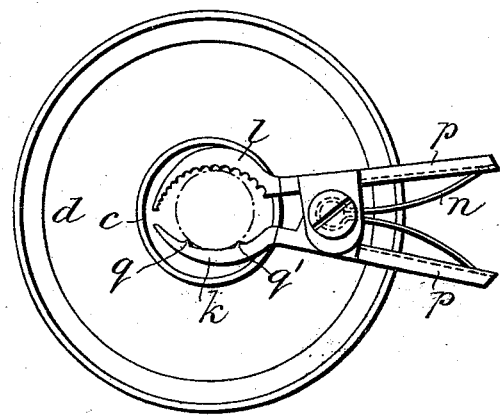
Figure 11:
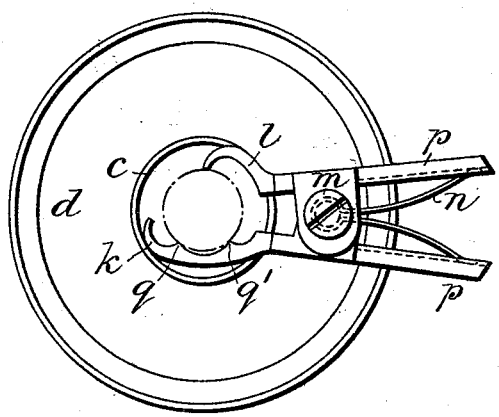
Figure 12:
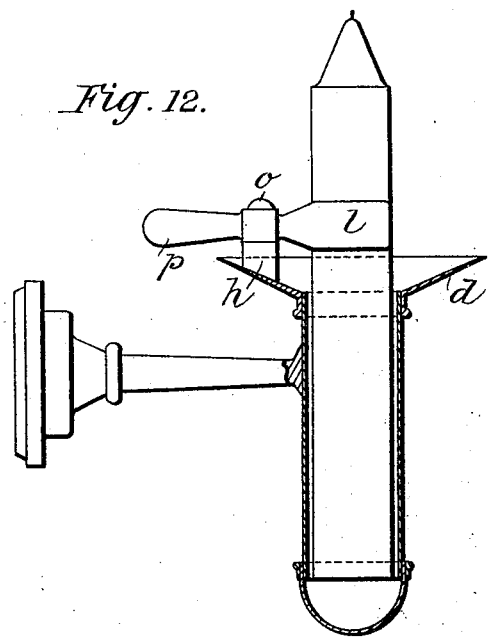
Figure 14:
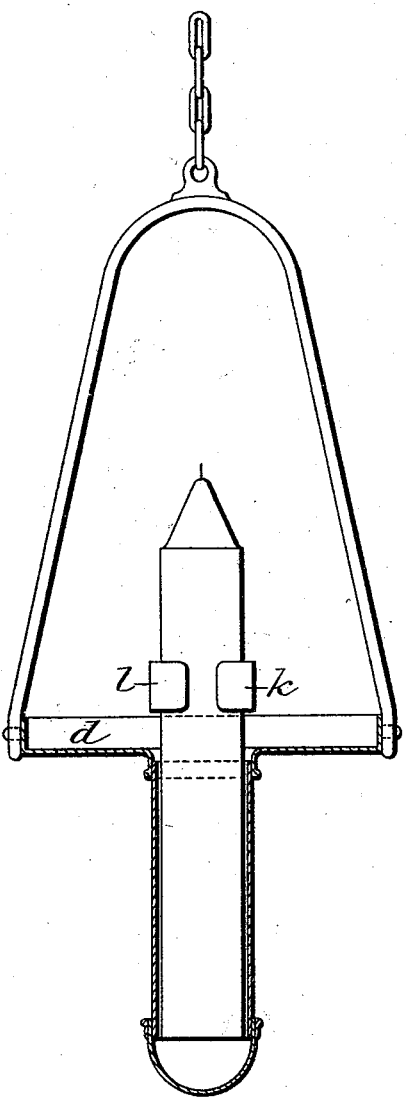
Figure 13:
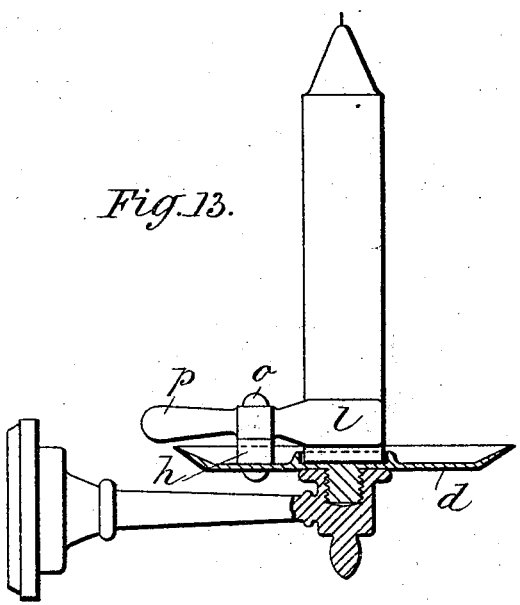

In the accompanying drawings Figure 1 is a central vertical section of a candle holder constructed according to my invention in its preferred form, the grippers being seen in elevation. Fig. 2 is a plan of the holder showing the grippers holding a candle of comparatively large diameter, being the largest size for which it is intended. Fig. 3 is a plan of the holder without the base and handle and showing the grippers holding a candle of medium diameter. Fig. 4 is a plan of the holder without the base and handle and showing the grippers holding a candle of small diameter. All the three sized candles are indicated in dotted lines in Fig. 1. Fig. 5 is a section of the gripper jaws on the line $xx$ of Fig. 2. Fig. 6 is a section of the gripper tails on the line $yy$ of Fig. 2. Fig. 7 is a central vertical section illustrating a modified construction of holder in which one of the jaws is a fixture to the candle seat. Fig. 8 is a plan of the holder shown in Fig. 7. Fig. 9 is a plan of the same holder without the base and handle and showing the jaws in the position they occupy when holding a candle of smaller diameter than that indicated in Fig. 8. Fig. 10 is a plan of a candle holder without the base and differing from that shown in Figs. 1 and 6 in the form of the jaws. Fig. 11 is a similar view to Fig. 10 and illustrating another modification. Fig. 12 is an elevation partly sectional illustrating the application of my invention to a bracket adapted to be secured to a window, wall or other surface by suction or otherwise. Fig. 13 is a similar view to Fig. 12 illustrating the application of my invention to another form of bracket. Fig. 14 is an elevation partly sectional illustrating the application of my invention to a hanging or suspended candle holder. Fig. 15 is an elevation partly sectional illustrating the application of my invention to a telescopic hanging duplex or double candle holder.

Referring first to Figs. 1 to 6, $a$ is the base of the candle holder and $b$ the handle of the same.

$c$ is a seat for the candle; the interior of this seat is made conical and preferably somewhat stepped as seen in Fig. 1 in order to provide a good support for the ends of candles of various diameters.

$d$ is a grease tray or cup preferably formed in a piece with the seat $c$. The tray $d$ is shown as secured to the base $a$ by means of a screw-threaded snug $e$ passed through a hole in the center of the base $a$ and then screwed up tight by means of a winged nut $f$. $g$ is a washer interposed between this nut and the under side of the base $a$. It is, however, obvious that the tray $d$ may be formed in one piece with the base $a$. On the tray $d$ is a pillar $h$ secured by a nut $i$ and serving to carry the two jaws or grippers $k$ $l$ which have lugs $m$ to fit on the pillar to which they are held by the screw $o$.

$n$ is a spring tending to push the tails $p$ $p$ of the jaws apart and thereby to press the jaws toward each other. It will be seen that the jaw or gripper $k$ has two approximately Λ-shaped teeth $q$ $q'$ at a certain distance apart, and that the jaw $l$ has teeth all along its gripping or nipping face. A line drawn from the tooth $q$ to the tooth $q'$ forms the base of an isosceles triangle as indicated in dots in Figs. 2, 3 and 4, the apex of which is in the jaw $l$, and the position of the apex will vary according to the distance between the jaws as determined by the diameter of the candle, and as will be clearly understood on reference to Figs. 2, 3 and 4, in which the several sized candles $r$ $r'$ $r^2$ and the corresponding position of the jaws are seen. (All the three sized candles are indicated by dots in Fig. 1.) The result is that no matter what is the diameter of the candle inserted between the jaws it is always nipped at three points, viz., by the two teeth $q$ $q'$ of the jaw $k$, and by one tooth, or sometimes two adjoining teeth of the jaw $l$. This triangular grip is always insured and holds the candle in a safer and more certain manner than when jaws are made either plain or with teeth all along their gripping face, unless indeed they are made and used for candles of one given diameter.

$s$ $s$, Fig. 5, are longitudinal grooves in the jaws; these grooves are not essential but are very desirable, because they divide each tooth into an upper and lower part; this gives the teeth better hold because as their depth is reduced and divided they are better enabled to enter a little into the substance of the candles. The tails $p$ $p$ of the jaws are preferably grooved as seen at $t$ $t$ Fig. 6, to prevent the spring $n$ slipping out of place. When it is required to clean the candle holder the jaws can be made to swivel as indicated in dotted lines in Fig. 4, so as to allow the seat $c$ and tray $d$ to be more readily got at.

Referring now to the modification shown in Figs. 7 to 9 the jaws $k$ and $l$ have teeth the same respectively as the jaws $k$ and $l$ of the holder shown in Figs. 1 to 6, but the jaw $k$ is fixed to the candle seat $c$. It will be seen that the spring $n$ is fitted between the movable jaw $l$ and a continuation of the handle $b$.

The modification shown in Fig. 10 will be understood without further explanation.

In the modification shown in Fig. 11 the jaw $l$ is without teeth and its outer end is turned inward so as to form the nipping point as indicated in the figure. In other respects the parts in this construction are like those shown in Figs. 1 to 6 inclusive.

The applications of the invention shown respectively in Figs. 12, 13, 14 and 15 will be understood without further explanation.

The combination comprising the pair of jaws or grippers $k$ $l$, a pillar $h$, a candle seat $c$ and a grease tray $d$ is not limited to the employment of jaws or grippers having teeth of the peculiar arrangement above described, as my invention includes the combination of the candle seat and grease tray with a pair of grippers having either plain gripping faces or gripping faces formed with ordinary teeth.

In applying my invention to existing candlesticks the ordinary socket of the candlestick can be plugged with cork or other suitable material and the snug $e$ be secured therein by screwing or otherwise.

What I claim, and desire to secure by Letters Patent, is—

1. In a candle holder, the jaw $k$ having two teeth $q$ $q'$ adapted to nip a candle at two points of its circumference in combination with the serrated jaw $l$ adapted to nip the candle at a third point of its circumference, the position of the said third point varying according to the distance between the two jaws as determined by the diameter of the candle, substantially as hereinbefore described and shown.

2. In a candle holder, a jaw $k$ having two nipping teeth $q$ $q'$ and a groove $s$ dividing each of said teeth into upper and lower parts, and means for holding a candle against the action of said jaw, substantially as and for the purpose hereinbefore described and shown.

3. In a candle holder, the combination of a candle seat $c$, a grease tray $d$, a pillar $h$ secured to said tray and a pair of candle grasping jaws mounted on said pillar and capable of swiveling thereon, substantially as and for the purpose hereinbefore described.

4. The combination substantially as described and shown of the jaw $k$ having two teeth $q\ q'$, the serrated jaw $l$, the candle seat $c$, the grease tray $d$, the pillar $h$ attached to said tray and carrying said jaws $k$ and $l$, the snug $e$ on the under side of said tray, the base $a$ having a central hole for the passage of said snug, and a nut $f$ screwed on said snug to connect the said tray and base together as set forth.

In witness whereof I have hereunto signed my name in the presence of two subscribing witnesses.

ROBERT HENRY HEPBURN.

Witnesses:
  WM. HENRY WILLIAMS,
  WALTER ROBERT JAMES,
Clerks to Mr. W. Howell, Solicitor and Notary, Llanelly.